(12) United States Patent
Kanno

(10) Patent No.: US 6,195,108 B1
(45) Date of Patent: Feb. 27, 2001

(54) IMAGE FORMATION METHOD FOR FORMING ELECTROSTATIC LATENT IMAGE ON PHOTOSENSITIVE BELT WITH LASER BEAM AND IMAGE FORMATION APPARATUS OF THE SAME

(75) Inventor: Hiromasa Kanno, Niigata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/356,459

(22) Filed: Jul. 19, 1999

(30) Foreign Application Priority Data

Jul. 17, 1998 (JP) .................................. 10-218690
Aug. 25, 1998 (JP) .................................. 10-238463

(51) Int. Cl.$^7$ ............................ B41J 2/385; G01D 15/16; G03G 15/01
(52) U.S. Cl. ........................................... 347/116; 347/133
(58) Field of Search ................................... 347/116, 129, 347/133, 134; 399/31, 130, 162, 301

(56) References Cited

U.S. PATENT DOCUMENTS

| | | | |
|---|---|---|---|
| 5,291,245 | * | 3/1994 | Charnitski et al. .............. 399/162 X |
| 5,342,715 | * | 8/1994 | Kamath et al. .................. 399/130 X |
| 5,381,167 | | 1/1995 | Fuji et al. . |
| 5,737,003 | * | 4/1998 | Moe et al. ............................ 347/116 |
| 5,821,971 | | 10/1998 | Rauch et al. ......................... 347/134 |
| 5,889,545 | | 3/1999 | Rauch et al. ......................... 347/134 |
| 5,905,519 | * | 5/1999 | Brenner, Jr. et al. ................ 347/116 |
| 5,978,003 | * | 11/1999 | Brenner, Jr. ......................... 347/116 |

FOREIGN PATENT DOCUMENTS

| | | |
|---|---|---|
| 4-16969 | 1/1992 | (JP) . |
| 4-274467 | 9/1992 | (JP) . |
| 4-275574 | 10/1992 | (JP) . |
| 5-119571 | 5/1993 | (JP) . |
| 10-86445 | 4/1998 | (JP) . |
| 10-86446 | 4/1998 | (JP) . |

* cited by examiner

*Primary Examiner*—Sandra Brase
(74) *Attorney, Agent, or Firm*—Foley & Lardner

(57) ABSTRACT

An image formation apparatus of the present invention forms an electrostatic latent image on a moving photosensitive belt by a laser beam produced by a laser device. A belt edge detector 1 detects an edge portion (belt edge) of a photosensitive belt 100 in a main scanning direction. A virtual edge detection circuit 2 generates a virtual edge detection signal 2A which changes a generation timing in accordance with a change of a detection timing of the belt edge detected by the belt edge detector 1. The generation timing of the virtual edge detection signal 2A does not almost follow the detection timing of the belt edge which changes by flaws and non-linearity of the belt edge, and changes in accordance with a slow change of the detection timing. A synchronizing signal generation circuit 3 and a driving circuit 4 drives the laser device so as to start a writing of an image data by the laser beam in synchronization with the virtual edge detection signal.

11 Claims, 10 Drawing Sheets

IMAGE FORMATION METHOD FOR FORMING ELECTROSTATIC LATENT IMAGE ON PHOTOSENSITIVE BELT WITH LASER BEAM AND IMAGE FORMATION APPARATUS OF THE SAME

BACKGROUND OF THE INVENTION

1. Field of the Invention

The present invention relates to an image formation method for forming an electrostatic latent image on an electrostatically charged photosensitive belt with a laser beam and an image formation apparatus of the same, more particularly to an image forming method which is capable of deciding a position for starting an image writing in a main scanning direction with a laser beam and an image formation apparatus of the same.

2. Description of the Prior Art

A laser printer, a copying machine and like using a photoconductive belt electrostatically charge a photosensitive body by a charger, and then form an electrostatic latent image on the photosensitive belt by scanning a laser beam including image information thereon, thus forming an electrostatic image. Regarding the electrostatic image, the electrostatic image is developed by a developing device and a developed image is formed by attaching toner onto the photosensitive belt. The developed image is transferred onto a recording paper, so as to record the image.

When a belt-shaped photosensitive body is used for the image formation using the laser beam, that is, for the formation of the electrostatic image, an oblique movement of the photosensitive belt or a slip of the photosensitive belt in a main scanning direction laser beam scanning direction) may occur. Therefore, the edge of the photosensitive belt slowly shifts to the main scanning direction. This is because when the photosensitive belt is driven by a roller separated from the belt, a relative positional offset in the main scanning direction by a slippage is apt to occur. Accordingly, there has been a problem that the position for staring the image writing by the laser beam is shifted with the movement of the photosensitive belt.

As a countermeasure to cope with such problem, as is recited in Japanese Patent Laid-open No. 4-274467 which was issued on Sep. 30, 1992, and Japanese Patent Laid-open No. 4-275574 which was issued on Oct. 1, 1992, presented is a method in which an edge portion (side edge) of a photosensitive belt in a main scanning direction is detected by a laser beam scanned during a latent image formation, and a position for stating writing in the main scanning direction is decided based on a detection signal detected by the laser beam.

Furthermore, a technology in which a sensor is disposed at an edge portion of a photosensitive belt in a main scanning direction (hereinafter, referred to a belt edge), and the belt edge is detected by the sensor as a reference position, thus controlling a timing of the main scanning by the laser beam and preventing a color misfit during formation of a color image is disclosed in Japanese Patent Laid-open No. 10-86446 (issued on Apr. 7, 1998), No. 10-86445 (issued on Apr. 7, 1998), No. 6-119571 (issued on May. 18, 1993) and No. 4-16969 (issued on Jan. 21, 1992).

However, there have been the following problems in the foregoing prior arts. Specifically, the photosensitive belt is made of a material with a mechanically low rigidity so that the photosensitive belt possesses an electrostatically charged property, so that such photosensitive belt is apt to be damaged. A non-linearity shape of the belt edge owing to the damage appears in an electrostatic latent image which is written to the photosensitive belt using the belt edge as a reference position.

Accordingly, there is a problem that when it is intended to record one straight line in a sub-scanning direction (driven direction of the photosensitive belt), an actually recorded image takes a jagged line shape similar to that of the belt edge.

SUMMARY OF THE INVENTION

An object of the present invention is to provide an image formation apparatus and an image formation method which are capable of forming a desired latent image of image data at a desired position where formation of the latent image is not influenced by flaws and non-linearity of a belt edge portion of a photosensitive belt.

Another object of the present invention is to provide an image formation method and an image formation apparatus which are capable of achieving a high quality electrostatic latent image formed by scanning a laser beam on a photosensitive belt, which is not influenced by a shape of a belt edge portion, when a color image is formed.

An image formation apparatus of the present invention forms an electrostatic latent image on a moving photosensitive belt by a laser beam of a laser device. The image formation apparatus of the present invention comprises a belt edge detector for detecting by a main scanning of a Laser beam an edge portion (belt edge) of the photosensitive belt in a main scanning direction; a virtual edge detection circuit for generating a virtual edge detection signal which change its generation timing in accordance with a change of a detection timing of the belt edge detected by the belt edge detector, the generation timing of the virtual edge detection signal almost not following the detection timing which changes by flaws and non-linearity of the belt edge and following a slow change of the detection timing; and a driving circuit for driving the laser device so as to start a writing of an image data by the laser beam in synchronization with the virtual edge detection signal.

In the image formation apparatus of the present invention, the slow change of the detection timing is a change produced by an oblique movement of the photosensitive belt or a slip of the belt in the main scanning direction, and a changing time is sufficiently longer than that by flaws and non-linearity of the belt edge.

To be concrete, the belt edge detector detects the belt edge and a reference position which is somewhat apart from the belt edge. Moreover, the virtual edge detection circuit changes the generation timing of the virtual edge detection signal in accordance with a change of a time difference between the detection timing of the reference position and the detection timing of the belt edge.

Another image formation apparatus of the present invention comprises a belt edge detector for detecting by a main scanning for said photosensitive belt an edge portion (belt edge) of a photosensitive belt in a main scanning direction; a lamp signal generator for generating a lamp signal for each main scanning by the laser beam, the lamp signal rising up to a predetermined level; an integrator; a comparator for generating a virtual edge detection signal when a level of the lamp signal and a level of an output signal of the integrator are coincident with each other; a phase comparator for comparing a detection time of the belt edge by the belt edge detector and a generation time of the virtual edge detection signal; and an adjusting circuit for adjusting the level of the output signal of the integrator based on a comparison result. In this case, the adjusting circuit adjusts the level of the output signal of the integrator by a change of the detection timing of the belt edge, and the generation timing of the virtual edge detection signal from the comparator changes.

The adjusting circuit is a charge pump which adjusts the level of the output signal of the integrator by charging/discharging charges of a prescribed amount in/from the integrator.

In the image formation apparatus of the present invention, the photosensitive belt may have a marking for indicating a belt jointing portion. In this case, the image formation apparatus of the present invention further includes a marking detector for detecting the marking, and a charge/discharge processing switching circuit for switching a charge/discharge processing by the charge pump based on the marking detected by the marking detector.

An image formation method for forming an electrostatic latent image on a moving photosensitive belt by a laser beam of a laser device, comprises the steps of detecting an belt edge portion (belt edge) of the photosensitive belt in a main scanning direction by a main scanning of the laser beam; generating a virtual edge detection signal which change its generation timing in accordance with a change of a detection timing of the belt edge, the generation timing of the virtual edge detection signal almost not following the detection timing which changes by flaws and non-linearity of the belt edge and following a slow change of the detection timing; and driving the laser device so as to start a writing of an image data by the laser beam in synchronization with the virtual edge detection signal.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENTS

Figure 1:
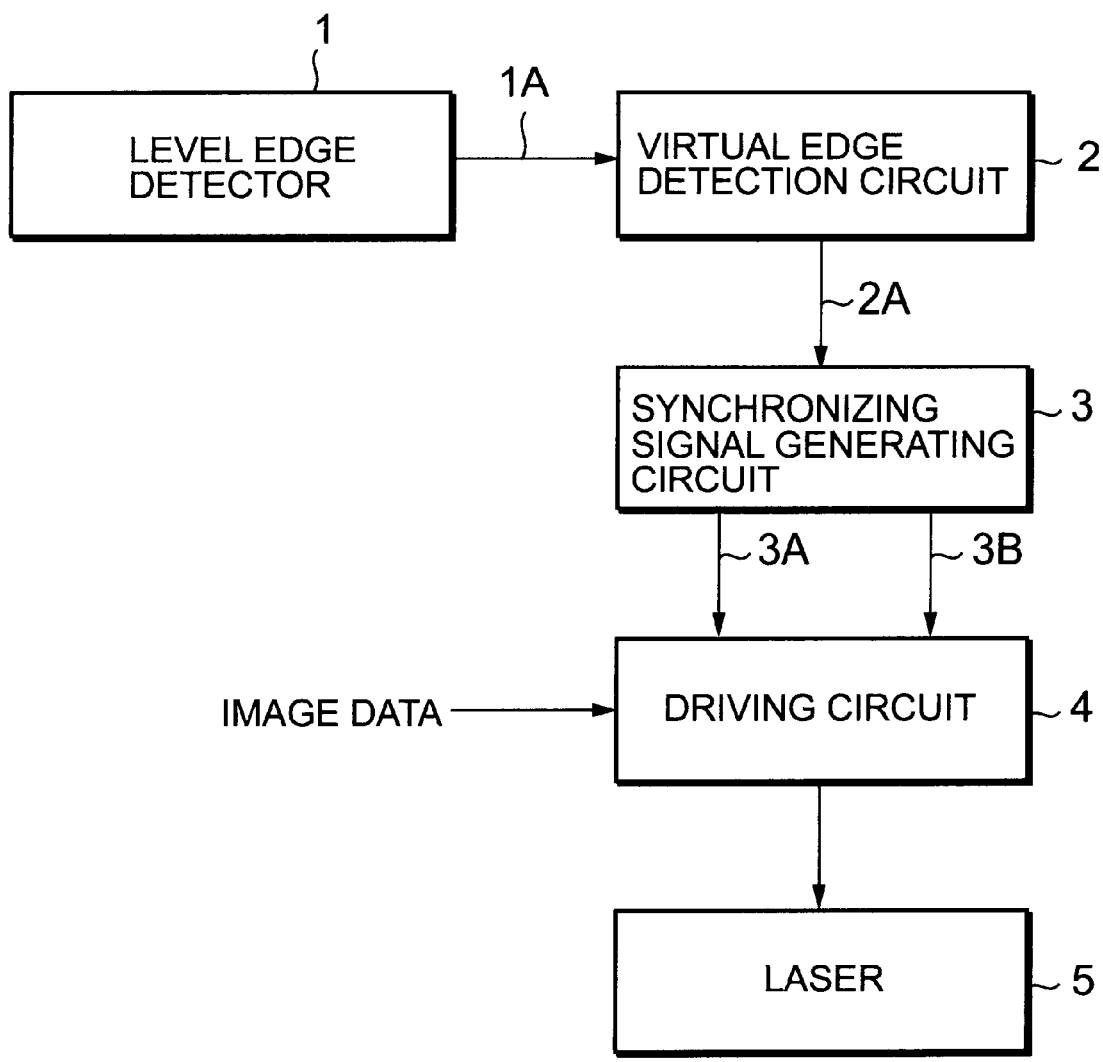
FIG. 1 is a block diagram showing an image formation apparatus of a first embodiment of the present invention.
Figure 2:
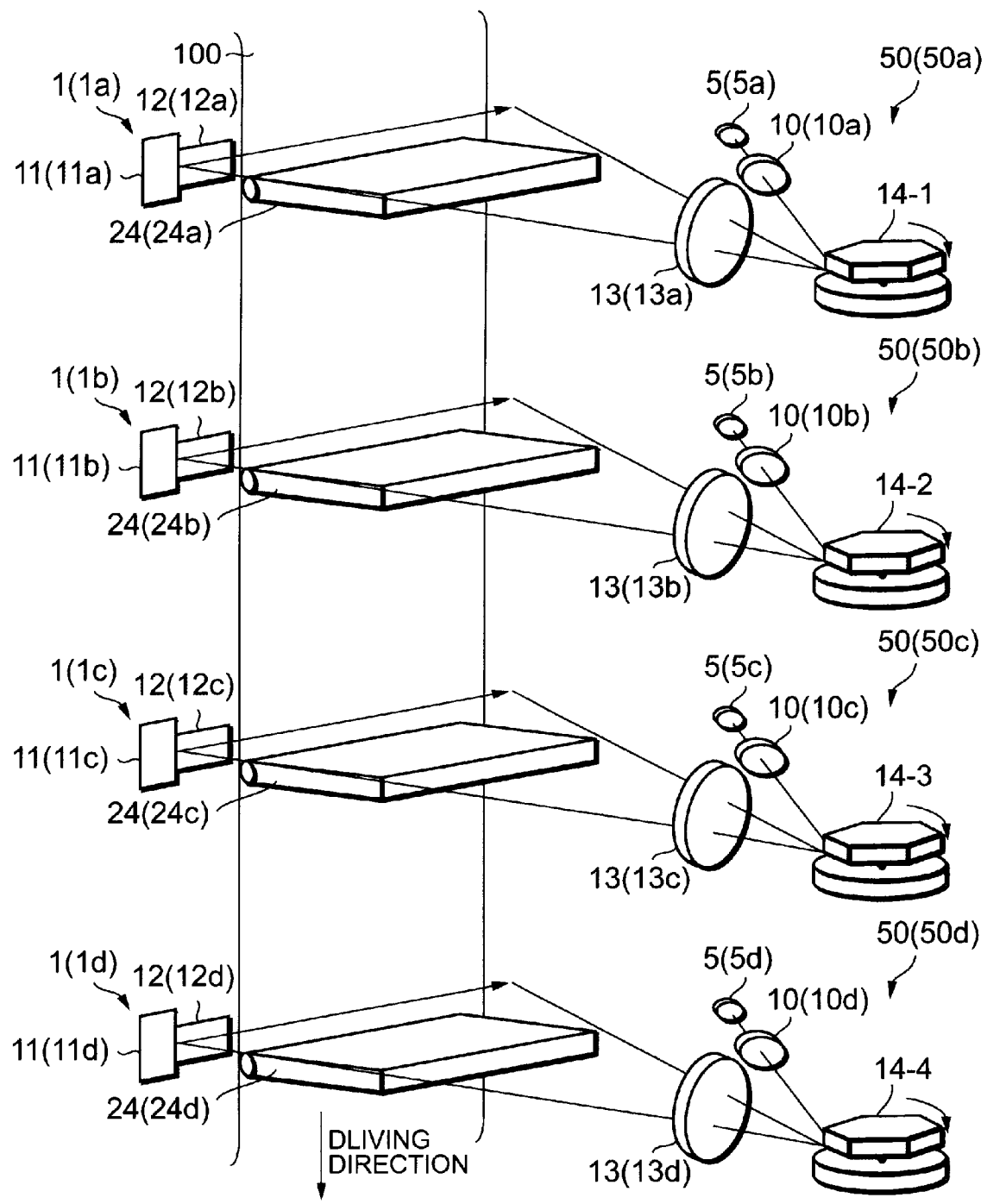
FIG. 2 is a schematical perspective view of a color image formation apparatus using the image formation apparatus of FIG. 1.

FIG. 1 is a block diagram showing an image formation apparatus of a first embodiment of the present invention, and FIG. 2 is a schematically perspective view of a color image formation apparatus using the image formation apparatus of FIG. 1.

First, the color image formation apparatus of FIG. 2 will be described. As shown in FIG. 2, the color image formation apparatus has a photosensitive belt 100; laser scanning sections 50 (50a, 50b, 50c and 50d) for forming an electrostatic latent image for four colors of yellow, magenta, cyan and black; belt edge detectors 1(1a, 1b, 1c and 1d) provided for corresponding colors; and developers 24(24a, 24b, 24c and 24d for four colors).

First, the photosensitive belt is charged by a charger (not shown). Then, the photosensitive belt 100 is moved in a driven direction by rotating by a roller (not shown). Each of the laser scanning sections 50 converts a laser beam from corresponding one of lasers 5(5a, 5b, 5c and 5d) to a parallel light by corresponding one of collimator lenses 10(10a, 10b, 10c and 10d), and irradiates the parallel light onto corresponding one of polygon mirrors 14(14a, 14b, 14c and 14d). Each of the polygon mirror 14(14a, 14b, 14c and 14d) reflects the laser beam while rotating, and the reflected laser beam passes through corresponding one of Fθ lenses 3(3a, 3b, 3c and 3d) and then is irradiated onto the photosensitive belt 100. At this time, a scanning direction of the laser beam on the photosensitive belt 100 is identical to the main scanning direction, which is perpendicular to the movement direction of the photosensitive belt, that is, a rotation direction thereof.

On an edge portion (belt edge) of the photosensitive belt 100 in the main scanning direction, fixedly disposed are belt edge detectors 1(1a, 1b, 1c and 1d) respectively corresponding to the four colors. During the main scanning, the laser beams from the lasers 5 are irradiated not only onto the photosensitive belt 100 but also onto the respective belt edge detectors 1. Electrostatic latent images formed on the photosensitive belt 100 by each laser scanning are sequentially developed by corresponding developers 24(24a, 24b, 24c and 24d), and finally an image is transferred onto a paper (not shown) and outputted.

An image formation apparatus shown in FIG. 1 is provided for each of the four colors of the color image formation apparatus shown in FIG. 2, and controls the drive of each of the laser beams 5(5a, 5b, 5c and 5d) based on the outputs of the belt edge detectors 1(1a, 1b, 1c and 1d).

Referring to FIG. 1, the image forming apparatus of the present invention has a belt edge detector 1; a virtual edge detection circuit 2 for generating a virtual edge detection signal 2A corresponding to a virtual belt edge position, based on a belt edge detection signal 1A from the belt edge detector 1; a synchronous signal generating circuit 3 for generating a main scanning start signal 3A and a sub-scanning start signal 3B which are synchronous with the virtual edge detection signal 2A, a driving circuit 4 for driving a laser 5 so as to start writing of image data by a laser beam in synchronization with the main scanning start signal 3A and the sub-scanning start signal 3b; and the laser 5.

The belt edge detector 1 detects a belt edge and a fixed position somewhat apart from the belt edge when the laser beam is irradiated from the laser beam 5 of FIG. 2, and outputs the belt edge detection signal 1A as a result of the detection.

Figure 3:
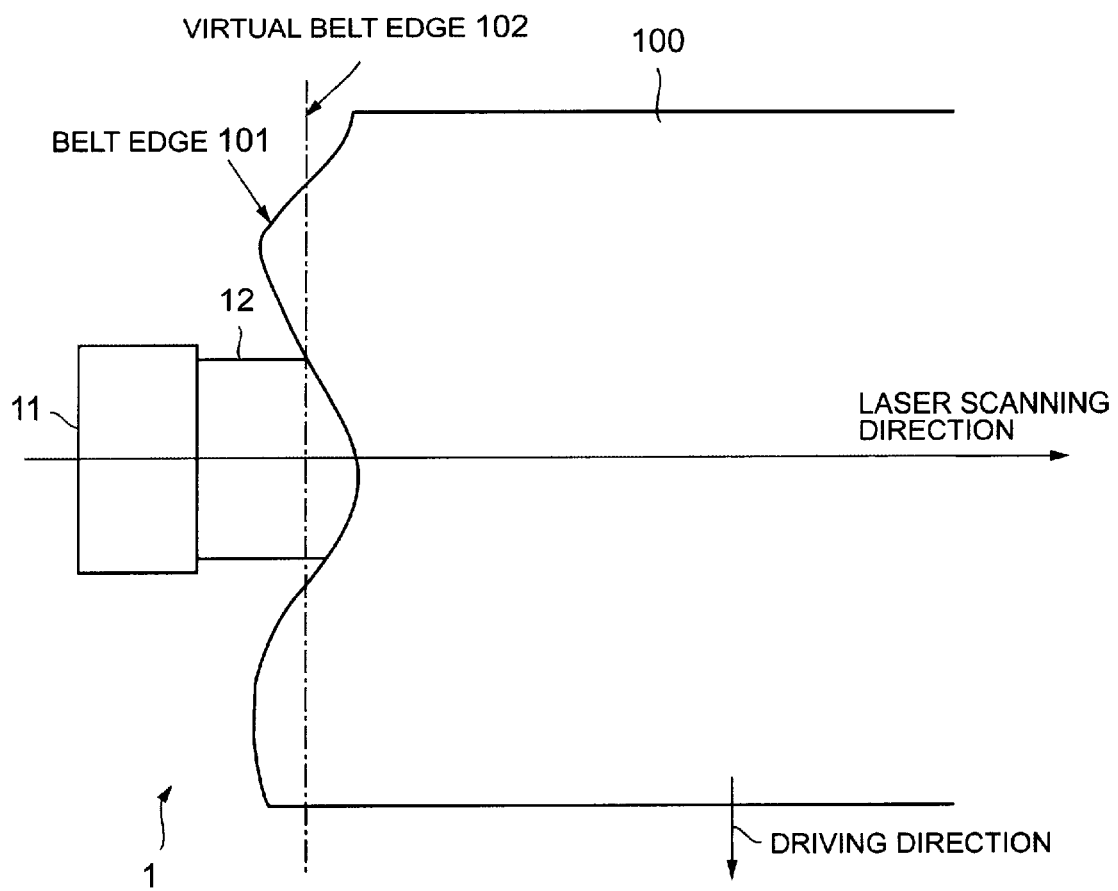
FIG. 3 is an enlarged plan view showing a positional relationship between a photosensitive belt and a belt edge detector of the image formation apparatus of FIG. 1.

FIG. 3 is an enlarged plan view showing a positional relationship between the photosensitive belt 100 and the belt edge detector 1.

Each of the belt edge detector 1(1a, 1b, 1c and 1d) includes a light shielding member 11(11a, 11b, 11b and 11d) and a photo-detection sensor 12 (12a, 12b, 12c and 12d) which are at a position somewhat apart from the belt edge 101 in a main scanning direction (reference position) as shown in FIGS. 2 and 3.

The light shielding members 11 are made of a material which allows no laser beam to pass therethrough, and fixedly arranged at a position where scanning of the laser beam starts. In FIG. 2, the light shielding members 11 are vertically disposed along a straight line perpendicular to a main scanning direction of the laser beam.

Each of the photo-detection sensors 12 is disposed behind the light shielding member 11 when viewed from the incidence direction of the laser beam, that is, the each of the photo-detection sensor 12 is disposed below the light shielding member 12, and the belt edge. It should be noted that also the photosensitive belt 100 is made of a material which does not allow the laser beam to pass therethrough. Although the photosensitive belt 100 does not necessarily inhibit the laser beam to pass therethrough perfectly, the photosensitive belt 100 shields almost all of the lights.

When the laser beam emitted from the laser 5 is irradiated, the photo-detection sensor 12 detects the edge portion of the light shield member 11 (right edge portion in FIG. 3) and the belt edge 101, thus outputting a belt edge detection signal 1A. Here-upon, the edge portion of the light shield member 11 is disposed at a fixed position, its detection signal is generated at a certain timing in synchronization with the laser scanning. The detection signal indicating the detection of the belt edge 101 is generated at a timing different from in accordance with the shape of the belt edge 101. As described above, the belt edge detection signal 1A rises and drops at the two timings. Specifically, one is the detection timing of the light shield member 11 and the other is the detection timing of the belt edge 101.

The virtual edge detection circuit 2 generates a virtual edge detection signal 2A which changes its generation timing with the change of the detection timing of the belt edge detected by the belt edge detector 1.

To be more concrete, the virtual edge detection circuit 2 generates the virtual edge detection signal 2A which changes its generation timing with the change of a time difference t1 between the detection timing of the edge portion (reference position) of the light shield member 11 by the belt edge detector 1 and the detection timing of the belt edge 101. It should be noted that the detection timing of the edge portion of the light shield member 11 is constant for each main scanning. Even when the time difference t1 changes rapidly depending on flaws and non-linearity of the belt edge 101, the generation timing of the virtual edge detection signal 2A does not almost follow the rapid change of the time difference t1, but changes with a slow change of the time difference t1. The slow change of the time difference t1 is a change produced by the oblique movement or slip of the photosensitive belt 100. The photosensitive belt 100 moves slowly in the main scanning direction by the oblique movement or the slip. A change rate of the time difference t1 per unit time owing to the movement of the photosensitive belt 100 in the scanning direction is sufficiently longer than that owing to flaws and non-linearity of the belt edge 101. Accordingly, the generation timing of the virtual edge detection signal 2A is not almost influenced by the flaws and non-linearity of the belt edge 101, and changes in accordance with the slow movement of the photosensitive belt 100 in the main scanning direction (the scanning direction of the laser beam).

A virtual belt edge 102 of FIG. 3 shows a position corresponding to the generation timing of the virtual edge detection signal 2A.

A synchronous signal generation circuit 3 generates the main scanning start signal 3A and the sub-scanning start signal 3B in synchronization with the virtual edge detection signal 2A. The sub-scanning start signal 3B is generated by counting the main scanning start signal 3A A driving circuit 4 takes in the image data T, and determines the writing start position in the sub-scanning direction for the image data by the sub-scanning start signal 3B. The driving circuit determines the writing start position in the main scanning direction by the main scanning start signal 3A, thus driving the laser 5.

As described above, in the image formation apparatus of FIG. 1, the writing start positions in the main and sub-scanning directions for the image data change with the movement of the photosensitive belt 100 to the main scanning direction (the scanning direction of the laser beam), almost without being influenced by the flaws and non-linearity of the belt edge 101.

Accordingly, even when there are the flaws and non-linearity in the belt edge 101 of the photosensitive belt 100, it is possible to form a latent image of the image data at a desired position where such flaws and non-linearity do not appear in the recorded image. Furthermore, since the influence of the oblique movement of the photosensitive belt 100 can be prevented by the change of the writing start position for the image data, the color misfit can be perfectly prevented in forming the color image.

Figure 4:
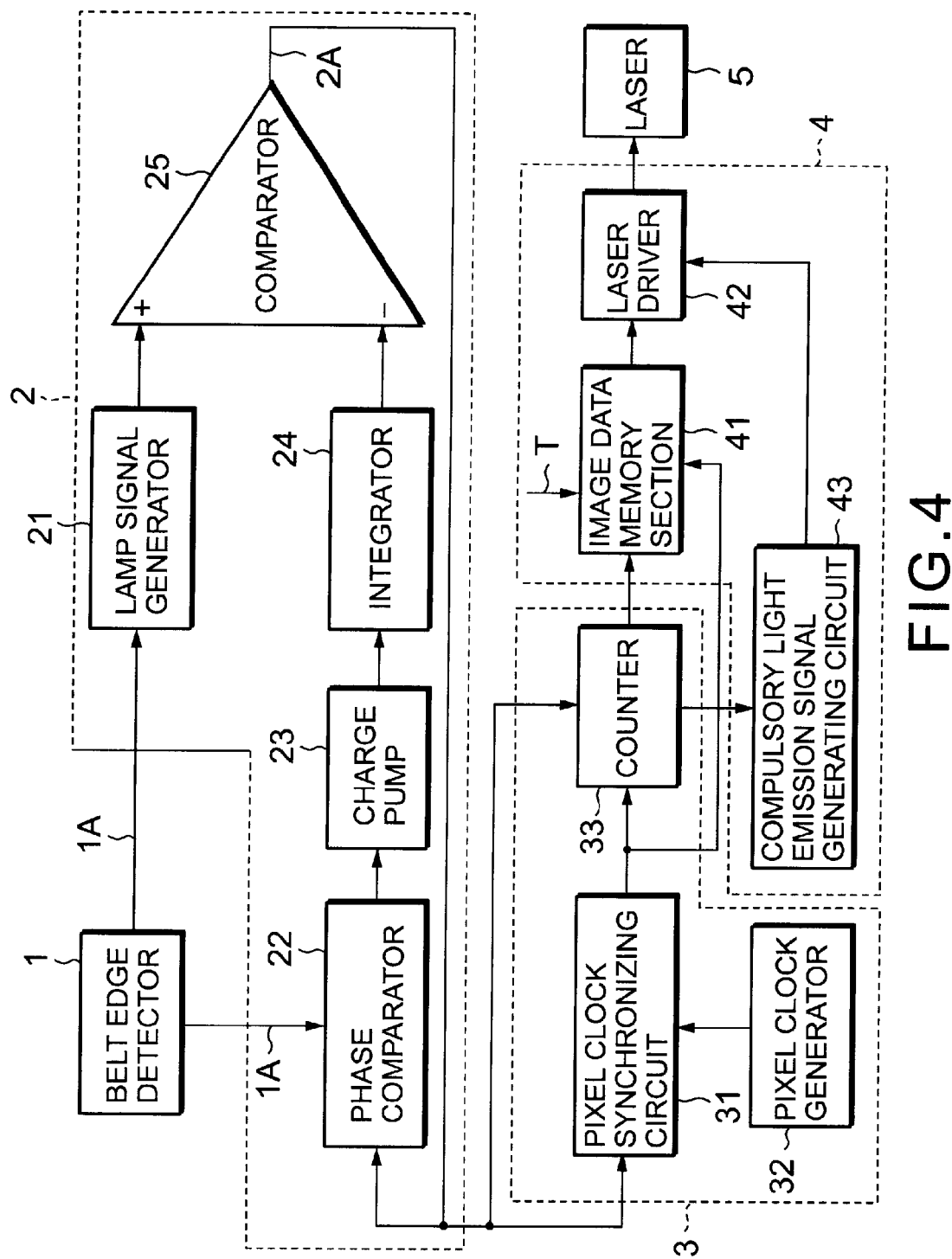
FIG. 4 is a block diagram of the image formation apparatus of the first embodiment shown in FIG. 1.
Figure 5:
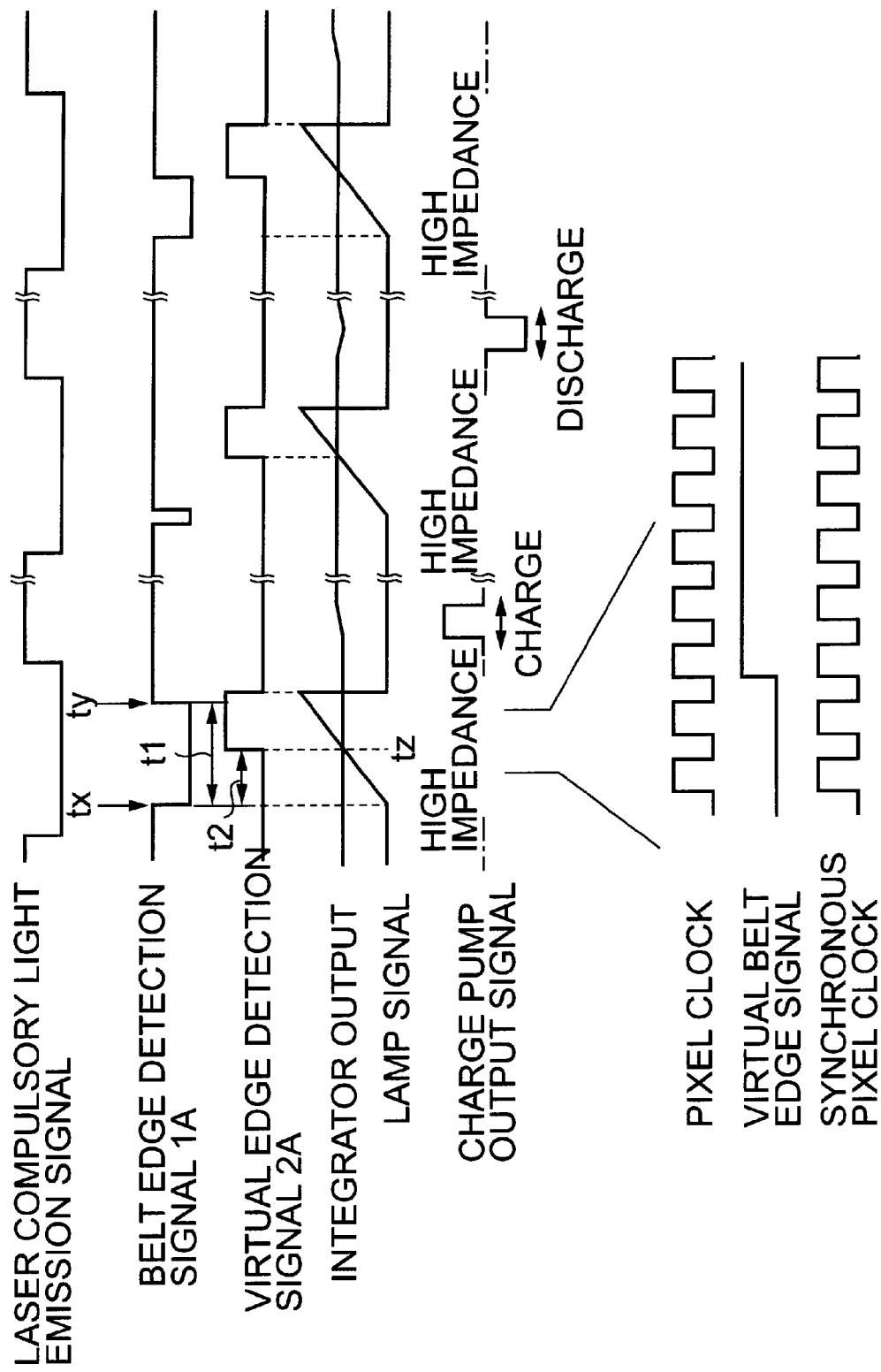
FIG. 5 is a timing chart showing an operation of the image formation apparatus shown in FIG. 4.

FIG. 4 is a block diagram showing a first example of the image formation apparatus of FIG. 1, and FIG. 5 is a timing chart showing an operation of the image formation apparatus of FIG. 5.

Referring to FIG. 4, when the laser beam is irradiated from the laser 5, the belt edge detector 1 detects the edge portion of the light shield member 11 and the belt edge 101 which are somewhat apart from the belt edge portion, thus outputting the belt edge detection signal 1A.

A lamp signal generator 21 generates a lamp signal which has an amplitude rising up with a constant gradient based on the detection timing of the edge portion of the light shield member 11 in the belt edge detection signal 1A.

A comparator 25 compares the lamp signal from the lamp signal generator 21 with a virtual edge setting signal outputted from an integrator 24, thus generating a virtual edge detection signal 2A.

Furthermore, a phase comparator 22 outputs the result obtained by comparing the belt edge detection signal 1A with the timing of the virtual edge detection signal 2A outputted from the comparator 25. A charge pump 23 is designed such that the charge pump 23 charges/discharges a prescribed amount of charges in/from the integrator 24 in response to the signal from the phase comparator 22. The integrator 24 holds a voltage which changed as result of charging and discharging.

The virtual edge detection circuit 2 is constituted by the lamp signal generator 21, the phase comparator 22, the charge pump 23, the integrator 24 and the comparator 25.

A pixel clock generator 32 generates clocks serving as a reference of image data output timing. A pixel clock synchronizing circuit 31 outputs the clocks generated by the pixel clock generator 32 while allowing the clocks to be synchronous with the virtual edge detection signal 2A from the comparator 25.

A counter 33 counts the virtual edge detection signal 2A as well as the synchronous pixel clocks based on the virtual edge detection signal, so as to output the counting value. Thus, the counter 33 generates the main scanning start signal and the sub-scanning start signal which are synchronized with the virtual edge detection signal 2A.

An image data memory section 41 stores the image data T therein based on the counting value of the counter 33 and the pixel clocks from the pixel clock synchronizing circuit 31, and reads out the image data T therefrom to output it.

A compulsory light emission signal generation circuit 43 generates a laser light emission signal when the laser beam starts to scan the belt edge, and a laser driver 42 drives the laser 5 in response to the image data from the image data memory section 41 and the light emission signal from the compulsory light emission signal generation circuit 21.

The image formation apparatus of FIG. 4 compares the phase difference between the actual belt edge signal detected by the belt edge detector 1 and the virtual edge detection signal 2A indicating the detection of the belt edge, and perform a charge/discharge processing of the integrator in accordance with the phase difference. By shifting the writing position by the laser in the main scanning direction, a printing offset on the recording paper can be prevented.

Next, an operation of the image formation apparatus of FIG. 4 will be described in detail.

Referring to FIGS. 4 and 5, the belt edge detector 1 detects the edge portion of the light shield member 11 and the edge portion (belt edge) of the photosensitive belt 10, and generates the belt edge detection signal 1A containing the timing tx of the detection of the edge portion of the light shield member 11 and the timing ty of the detection of the belt edge.

The lamp signal generator 21 generates the lamp signal using the timing tx of the detection of the edge portion of the light shield member 11 as a reference point for a predetermined period of time. The generation of the lamp signal is terminated after the detection timing of the belt edge.

The comparator 25 compares the lamp signal from the lamp signal generator 21 with the signal from the integrator 24, and generates the virtual edge detection signal 2A indicating the virtual detection of the belt edge.

Assuming that the time difference between the timings tx and ty of the belt edge detection signal 1A from the belt detector 1 be t1 and the time from the timing tx to the generation timing tz of the virtual edge detection signal 2A be t2, the phase comparator 22 compares the time t1 with the time t2, and outputs a phase difference detection signal indicating which formula is satisfied among t1>t2, t1<t2, and t1=t2.

If the comparison result of the phase comparator 23 satisfies t1>t2, the charge pump 23 charges a prescribed amount of charges in the integrator 24, and if the comparison result of the phase comparator 23 satisfies t1<t2, the phase comparator 23 discharges the prescribed amount of charges from the integrator 24. If t1=t2 is satisfied, the phase comparator 23 does not perform the charge/discharge. Hereupon, the prescribed amount of charges means an amount of charges which is charged/discharged with a voltage less than $\frac{1}{100}$ the voltage of the integrator 24 at the time of full charge.

These operations are performed for each main scanning, and the integrator 24 holds the voltage which is changed by the charge/discharge. The comparator 25 compares the voltage held by the integrator 24 with the lamp signal in the subsequent scanning, thus generating the virtual edge detection signal 2A.

Even when the time difference t1 rapidly changes due to the non-linearity of the belt edge 101 of FIG. 3, the generation timing of the virtual edge detection signal 2A does not almost follow the rapid change of the time difference t1, and changes with a slow change of the time difference t1. If the amount of charge/discharge at a time is larger, the generation timing tz of the virtual edge detection signal 2A easily follows the rapid change of the time difference t1. Accordingly, the foregoing prescribed amount of charges should be limited to the one that is charged/discharged by a voltage less than $\frac{1}{100}$ the voltage at the time of the full charge.

Specifically, even when the value of the time difference t1 rapidly changes for each scanning due to the flaws and non-linearity of the belt edge portion, the charge/discharge amount of the charge pump 23 at a time is selected to a small value enough to change the generation timing tz of the virtual edge detection signal 2A slowly, so that generation timing tz follows the movement of the photosensitive belt 100 in the scanning direction occurred by the oblique movement or the slip of the photosensitive belt.

The change rate per unit time of the time difference t1 due to the movement of the photosensitive belt 100 in the scanning direction is sufficiently longer than that due to the flaws and non-linearity of the edge portion of the belt 1.

It should be noted that the signal from the integrator 24 is always outputted. For example, when the image formation is performed, the output from the integrator 24 at the time of the laser scanning of the first time is indefinite. In the scannings after the second time, a signal obtained by subjecting the voltage change originating from the charging/discharging to the integration is held in the integrator 24.

The pixel clock generator 32 generates the reference clocks serving as a reference of the output timing of the image data. Hereupon, since the virtual edge detection signal 2A is asynchronous with the reference clock, the reference clock must be synchronous with the virtual edge detection signal in order to form a latent image at a desired position by the laser scanning.

Hereupon, the pixel clock synchronizing circuit 31 outputs the synchronous pixel clock by allowing the reference clock from the pixel clock generator 32 to be synchronous with the virtual edge detection signal 2A.

The counter 33 counts the virtual edge detection signal 2A, and generates the sub-scanning start signal and counts the synchronous pixel clock for each virtual edge detection signal, thus outputting the main scanning start signal Then, the image data memory section 41 specifies the time for starting the image record in the sub-scanning direction based on the sub-scanning start signal from the counter 33. Furthermore, the image data memory section 41 specifies the time for starting the image record in the main scanning direction based on the main scanning start signal, and outputs the image data in synchronization with the synchronous pixel clock.

The compulsory light emission signal generation circuit 43 generates the laser light generation signal in response to the detection of the belt edge, based on the count value of the counter 17. The laser driver 42 drives the laser 5 in response to the image data from the image data memory section 41 and the light emission signal from the compulsory light emission signal generation circuit 43.

The image forming apparatus of FIG. 2 performs the foregoing processings for each color. Thus, the recorded image is not influenced by the shape of the belt edge, and the color misfit due to the movement of the photosensitive belt 100 in the main scanning direction does not occur.

Figure 6:
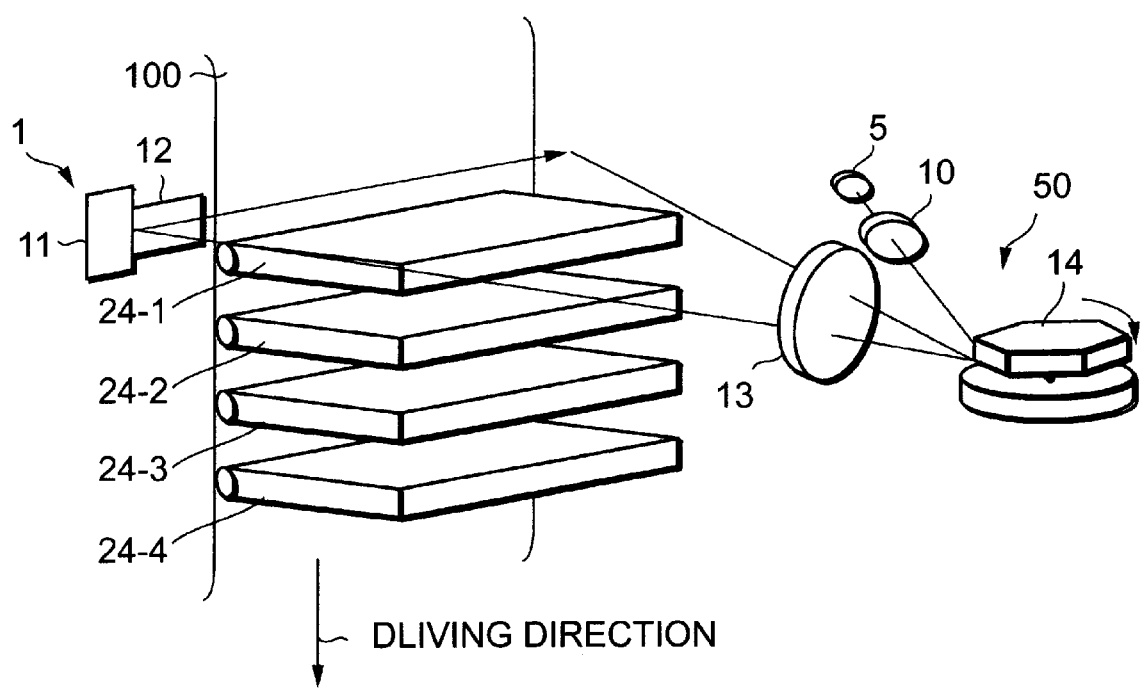
FIG. 6 is a schematical perspective view of another color image formation apparatus using the image formation apparatus of FIG. 1.

FIG. 6 is a perspective view showing another embodiment of the color image forming apparatus of the present invention.

In FIG. 6, the laser scanning section 50 is provided by one, and a laser beam from the laser 5 is converted to parallel lights by the collimator lens 10. The parallel lights are reflected by the polygon mirror 14 which is rotating, and scanned onto the photosensitive belt 100 after passing through the Fθ lens 13.

The belt edge detector 1 corresponding to the laser beam scanning is provided also by one. The light shield member 11 and photo-detection sensor 12 of the belt edge detector 1 are located at the position described in FIG. 2, and a latent image of a picture image formed on the photosensitive belt 100 is developed by the developer 24-1. A latent image of a picture image formed on the photoconductive belt 100 by the laser beam scanning in the second time is developed by the developer 24-2. Thus, processing is advanced in such manner that the formation of the latent image and the developing of the latent image are sequentially in this order.

To perform the formation of four color image, the photosensitive belt 100 must be rotated by four times. However, the number of parts can be reduced.

In the embodiment described above, even when there are flaws and a non-linearity in the belt edge portion, it is possible to form a latent image of a desired image data at a desired position where they do not have influence on a recorded image. Moreover, an image formed by the laser beam scanning for each color and by developing using the developer can be allowed to have a high quality without being influenced by the shape of the belt edge portion.

Figure 7:
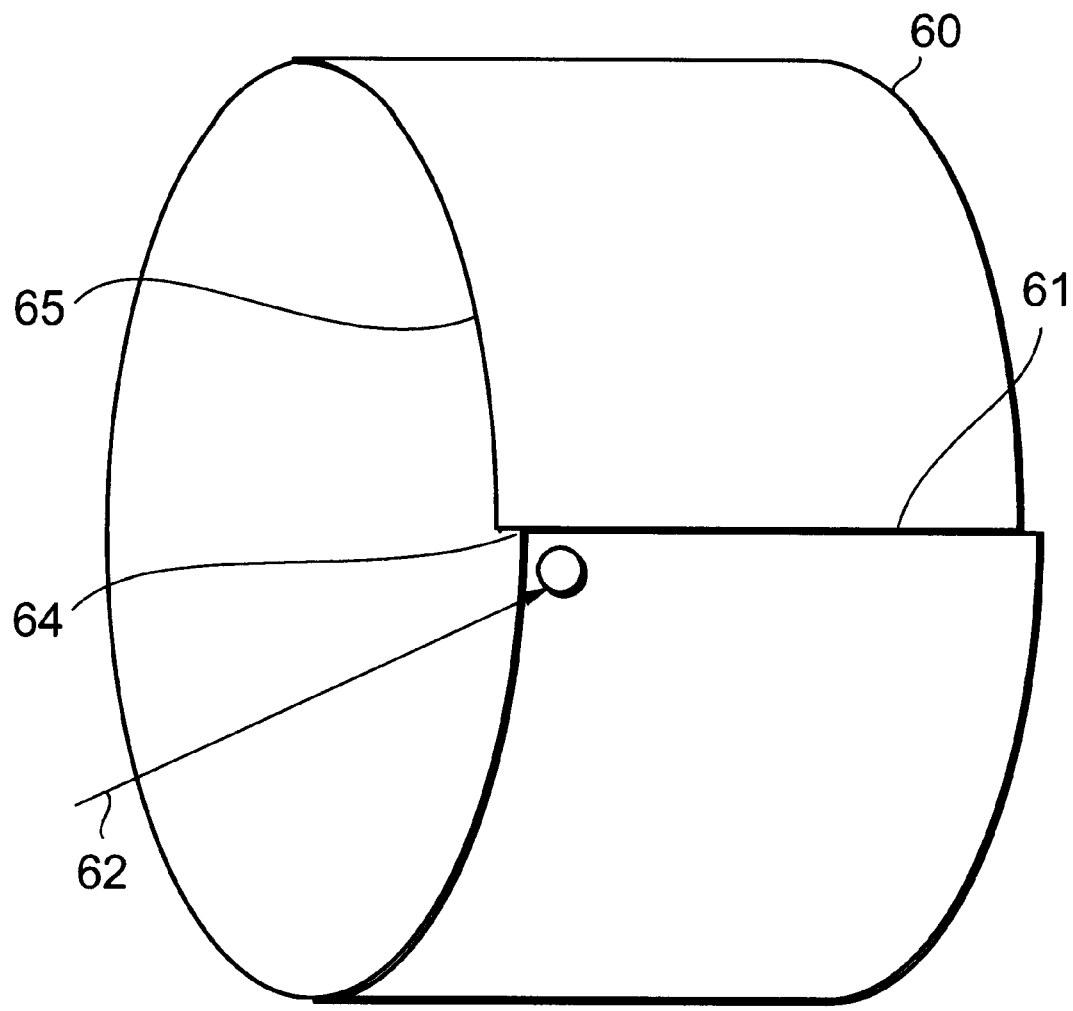
FIG. 7 is a perspective view another example of the photosensitive belt.

Although the photosensitive belt 100 used in the embodiment of the present invention is an edgeless belt having no edge portion, the belt 100 may be formed by joining both edges thereof At this time, as shown in FIG. 7, a step difference 64 is produced in the jointing portion 61 of the photosensitive belt 60. Ordinarily, the image formation is not performed in the jointing portion. A height of the step difference 64 is far larger than the flaws and the non-linearity of the belt edge portion 65.

Figure 8:
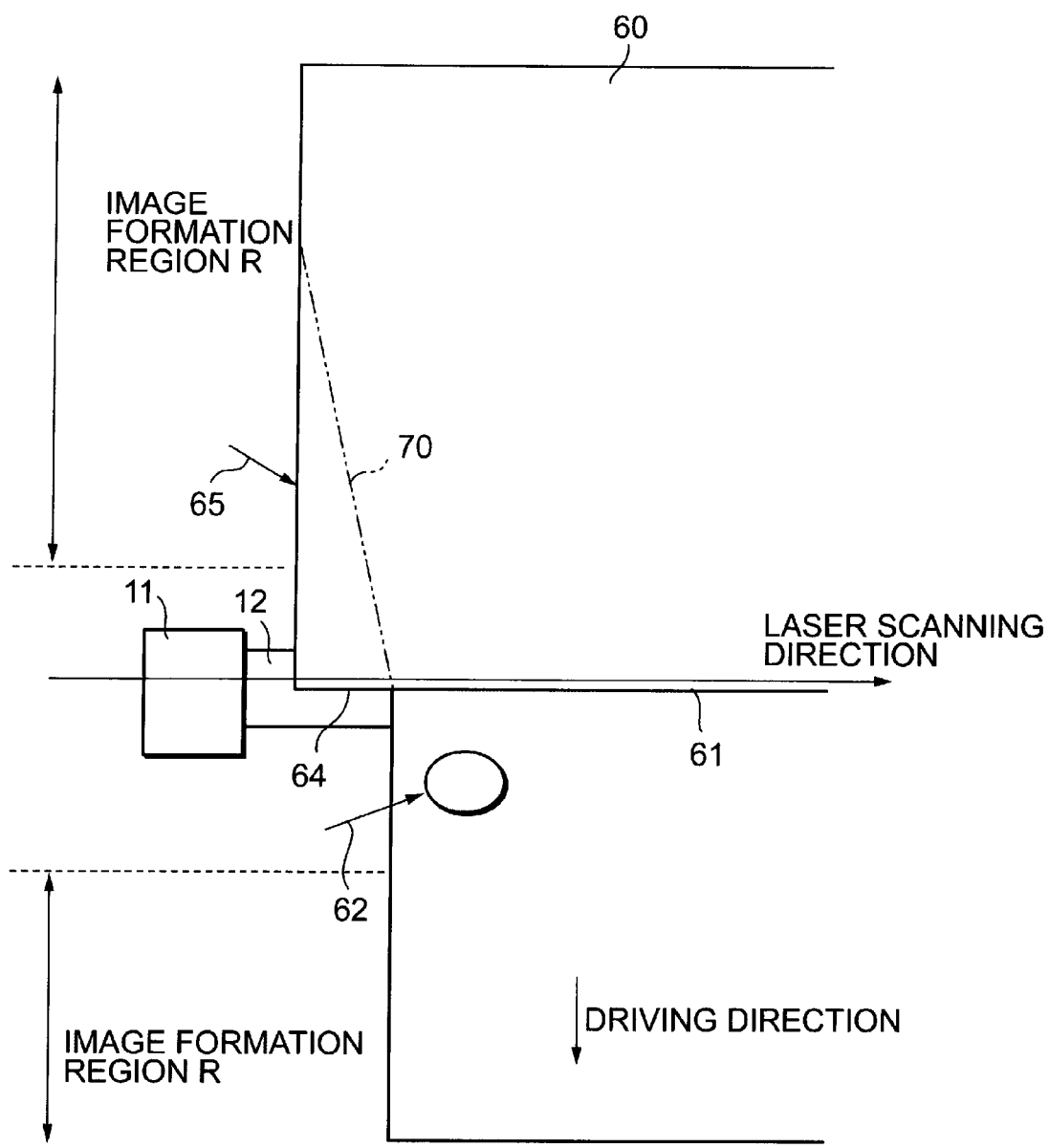
FIG. 8 is an enlarged plan view showing a positional relationship between the photosensitive belt of FIG. 7 and the image formation apparatus of FIG. 4.

When a photosensitive belt 60 shown in FIG. 7 is used instead of the photosensitive belt 100, the virtual edge detection signal 2A does not follow the actual movement of the belt edge portion in the main scanning direction in the image formation apparatus shown in FIG. 4. This is because similar processing to that performed when the unevenness of the non-linearity of the belt edge is detected is performed, even when the step difference 64 of the jointing portion is detected by the belt edge detector 1. Specifically, the virtual edge indicated by virtual edge detection signal 2A of the image formation apparatus of FIG. 4 is significantly shifted from the actual belt edge portion. As shown in FIG. 8, the virtual belt edge 70 is significantly shifted from the actual belt edge 65 having the step difference 64.

Figure 9:
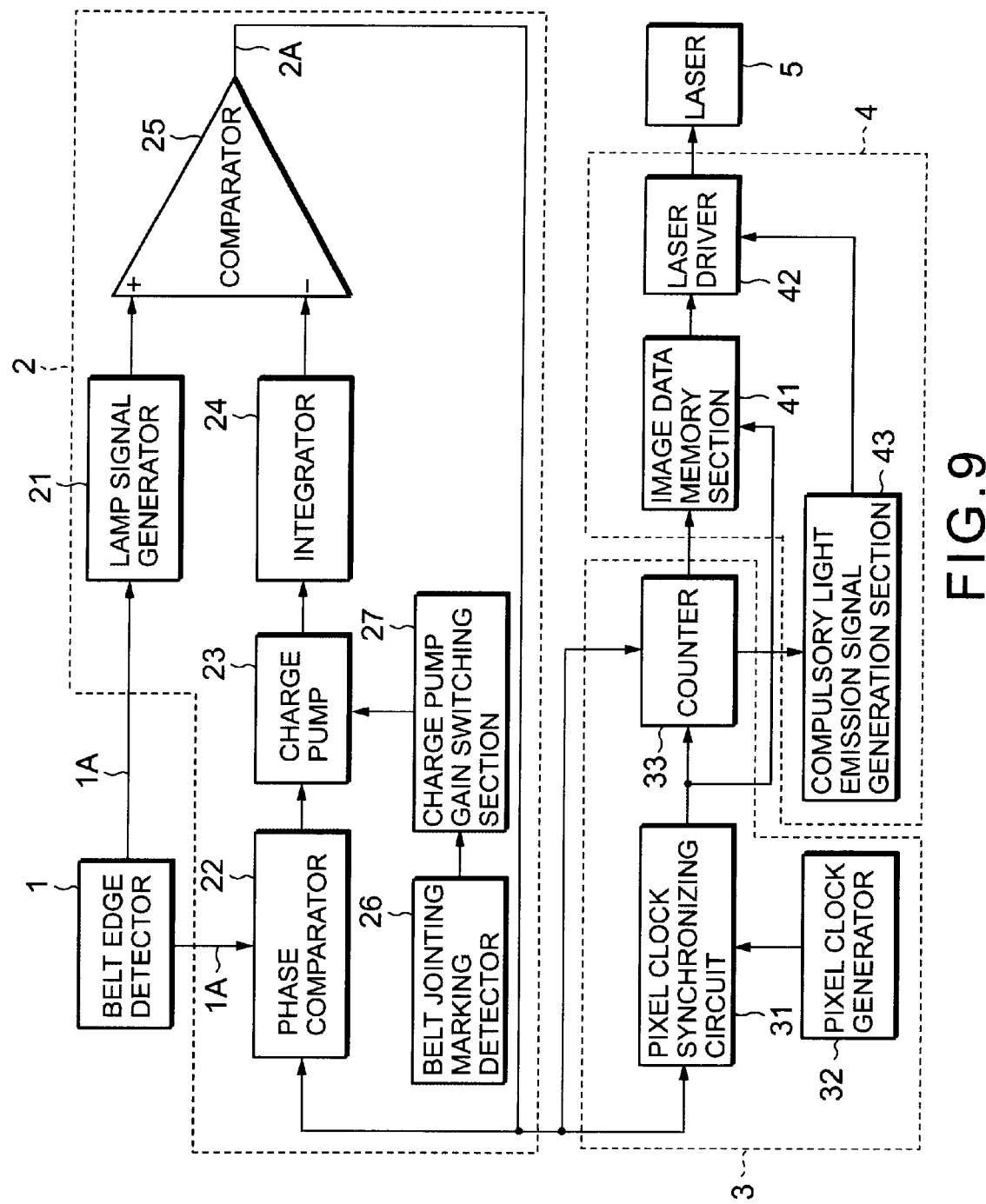
FIG. 9 is a block diagram showing a second embodiment of the image formation apparatus of FIG. 1.

FIG. 9 is a block diagram showing an embodiment of the image formation apparatus which can follow the position of the belt edge in the main scanning direction by the step difference of the jointing portion.

In FIG. 9, the same portions as those of FIG. 4 are denoted by the same reference numerals. The image formation apparatus of FIG. 9 has the constitution in which a belt jointing marking detector 26 and a charge pump gain switching device 27 are added to the virtual edge detection circuit 2 of the image formation apparatus of FIG. 4.

The belt jointing marking detector 26 detects the marking 62 provided in the vicinity of the jointing portion (near the step difference 64) of the belt edge 65 of the photosensitive belt 60 as shown in FIG. 7, and sedges out the marking detection signal to the charge pump gain switching section 27.

The charge pump gain switching section 27 performs a switching operation so as to allow the charge pump 23 to increase a charge/discharge amount and a charge/discharge time. Specifically, the charge pump gain switching section 27 increases the charge/discharge amount and the charge/discharge time from the charge pump 23 when the belt jointing portion 61 is scanned by the laser 5 of FIGS. 4 and 7.

If the amount of the charging/discharging performed once by the charge pump 23 is made to be equal to that of the image formation region (the portion other than the jointing portion of the photosensitive belt 60) similarly to the image formation apparatus of FIG. 4, the virtual belt edge 70 is significantly shifted from the actual belt edge. In order to prevent this, the charge pump gain switching section 27 performs switching so as to increase the charge/discharge amount of the charge pump 5 near the belt jointing portion 61. The switching of the charge/discharge amount by the charge pump 23 is performed by changing the charge/discharge time or the charge/discharge current.

Figure 10:
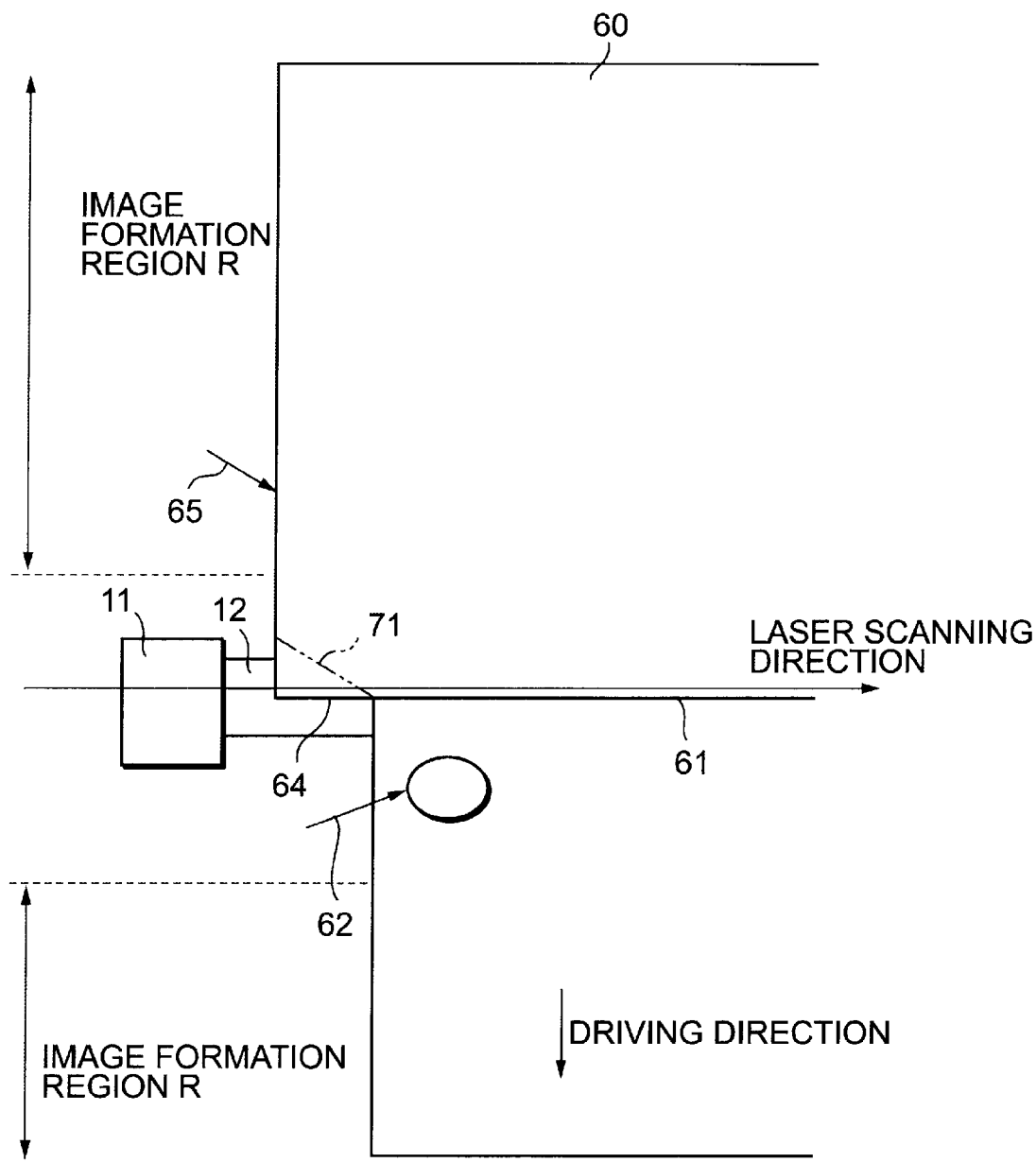
FIG. 10 is an enlarged plan view showing a positional relationship between the photosensitive belt of FIG. 7 and a belt edge detector of the image formation apparatus of FIG. 9.

Thus, as shown in FIG. 10, the virtual belt edge 71 indicated by the virtual edge detection signal 2A follows the actual belt edge 65 having the step difference 64.

When a predetermined period of time has passed after the marking is detected and the laser scanning region is changed to the image formation region R from the vicinity of the belt jointing portion 61, the charge gain switching portion 27 restores the charge/discharge amount to the same value to that of FIG. 4. As a result, in FIG. 10, a region P in the vicinity of the belt jointing portion 61 where the image formation is not performed is influenced by the shape of the belt edge portion, so as to follow the position of the belt.

As described above, according to the image formation apparatus shown in FIG. 9, the marking indicating the joint is provided on the belt edge portion of the photosensitive belt, and the charge/discharge amount or the charge/discharge time in the belt jointing portion where the image formation is not performed is increased, whereby the image formation is not influenced by the step difference of the belt jointing portion. Accordingly, the image which is formed by the laser beam scanning for each color and developed by the developer is not influenced by the shape of the edge portion of the photosensitive belt so as to have a high quality.

In the embodiments of the present invention, there are various modifications. For example, the marking 62 of FIG. 7 is constituted by any one of a light transmission window, a light reflection member, and a magnetic member.

Moreover, the belt jointing marking detector 26 of the image formation apparatus of FIG. 9 is constituted by any one of a transmission type photo-sensor, a reflection type photo-sensor and a magnetic sensor.

It is satisfactory that the virtual edge detection circuit 21 of FIG. 1 is not constituted by the analog circuit as shown in FIGS. 4 and 9, but a digital circuit. For example, the virtual edge detection signal 2A may be generated by a circuit using a microcomputer.

Although the preferred embodiments of the present invention have been described in detail, it should be understood that various changes, substitution and alternations can be made therein without departing from spirit and scope of the inventions as defined by the appended claims.

What is claimed is:

1. An image formation apparatus which forms an electrostatic latent image on a moving photosensitive belt by a laser beam of a laser device, comprising:
   a belt edge detector for detecting an edge portion (belt edge) of said photosensitive belt in a main scanning direction by a main scanning for said photosensitive belt;
   a virtual edge detection circuit for generating a virtual edge detection signal which change its generation timing in accordance with a change of a detection timing of said belt edge detected by said belt edge detector, the generation timing of said virtual edge detection signal following a slow change of said detection timing;
   a driving circuit for driving said laser device so as to start a writing of an image data by said laser beam in synchronization with said virtual edge detection signal, and
   wherein said virtual edge detection circuit includes a comparing circuit for a time difference between a detection timing of an actual belt edge detected by said belt edge detector and a generation timing of the virtual edge detection signal, and an integrator for performing a charge/discharge processing in accordance with the time difference.

2. The image formation apparatus according to claim 1, wherein the slow change of said detection timing is a change produced by a movement of said photosensitive belt in the main scanning direction, and a changing time is sufficiently longer than that by said flaws and non-linearity of said belt edge.

3. The image formation apparatus according to claim 1, wherein said belt edge detector detects said belt edge and a reference position which is somewhat apart from said belt edge.

4. The image formation apparatus according to claim 3, wherein said virtual edge detection circuit changes the generation timing of said virtual edge detection signal in accordance with a change of a time difference between the detection timing of said reference position and the detection timing of said belt edge.

5. The image formation apparatus according to claim 1, wherein said virtual edge detection circuit further includes an adjusting circuit for adjusting a level of an output signal of said integrator in response to the change of the timing of the detection of said belt edge.

6. The image formation apparatus according to claim 5, wherein said adjusting circuit is a charge pump for adjusting the level of the output signal of said integrator by charging/discharging a prescribed amount of charges in/from said integrator.

7. The image formation apparatus according to claim 6, wherein said photosensitive belt has a marking for indicating a belt jointing portion, a marking detector for detecting the marking is provided, and a charge/discharge processing switching circuit for switching a charge/discharge processing by said charge pump based on said marking detected by said marking detector is provided.

8. An image formation apparatus which forms an electrostatic latent image on a moving photosensitive belt by a laser beam of a laser device, comprising:
   a belt edge detector for detecting an edge portion (belt edge) of said photosensitive belt in a main scanning direction by a main scanning for said photosensitive belt;
   a lamp signal generator for generating a lamp signal for each main scanning by said laser beam, the lamp signal rising up to a predetermined level;
   an integrator;
   a comparator for generating a virtual edge detection signal when a level of said lamp signal and a level of an output signal of said integrator coincide with each other;
   a phase comparator for comparing a detection time of said belt edge by said belt edge detector with a generation time of said virtual edge detection signal; and
   an adjusting circuit for adjusting the level of the output signal of said integrator based on a comparison result,
   wherein said adjusting circuit adjusts the level of the output signal of said integrator by a change of the detection timing of said belt edge, and the generation timing of said virtual edge detection signal from said comparator changes.

9. The image formation apparatus according to claim 8, wherein said adjusting circuit is a charge pump which adjusts the level of the output signal of said integrator by charging/discharging charges of a prescribed amount in/from said integrator.

10. The image formation apparatus according to claim 9, wherein said photosensitive belt has a marking for indicating a belt jointing portion, a marking detector for detecting the marking is provided, and a charge/discharge processing switching circuit for switching a charge/discharge processing by said charge pump based on said marking detected by said marking detector is provided.

11. An image formation method, comprising the steps of:
   comparing a phase difference between an actual belt edge signal detected by a belt edge detector and a virtual edge detection signal indicating a virtual belt edge; and
   performing a charge/discharge processing for an integrator in accordance with the phase difference to shift a writing position by a laser, thus preventing a printing shift on a recording paper.

* * * * *